United States Patent [19]

Gastinger et al.

[11] Patent Number: 4,837,247
[45] Date of Patent: Jun. 6, 1989

[54] STABLE POLYMER POLYOLS IN BASE POLYOLS WITH MOLECULAR WEIGHT GREATER THAN 4000 USING HIGH MOLECULAR WEIGHT DISPERSANTS

[75] Inventors: Robert G. Gastinger, West Chester, Pa.; John E. Hayes, Wilmington, Del.

[73] Assignee: Arco Chemical Technology, Inc., Wilmington, Del.

[21] Appl. No.: 197,933

[22] Filed: May 24, 1988

[51] Int. Cl.$^4$ ............................................. C08G 18/14
[52] U.S. Cl. ................................... 521/137; 524/714; 524/732; 524/757; 523/185
[58] Field of Search ................ 521/137; 524/714, 732, 524/757; 525/185

[56] References Cited

U.S. PATENT DOCUMENTS 3,953,393  4/1976  Ramlow et al. ............... 260/31.8 R
4,119,586  10/1978  Shah ...................................... 521/137
4,458,038  7/1984  Ramlow et al. ..................... 521/137

Primary Examiner—Maurice J. Welsh
Attorney, Agent, or Firm—David L. Mossman; Steve Rosenblatt

[57] ABSTRACT

Low viscosity polymer polyols having high styrene/acrylonitrile ratios and good stability may be achieved by the use of a base polyol having a molecular weight higher than 4000, for example, from 4000 to 6500 and a high molecular weight (HMW) dispersant. The dispersant polyol may range from 1 to 20 wt. %, but may be less than 5 wt. % of the total polyol component of the polymer polyol. The HMW dispersant should have a molecular weight higher than about 6000. Preferably, a semi-batch reactor is used, and a relatively high concentration of the HMW dispersant is initially charged to the reactor, relative to the portion of base polyol. Monomer ratios of styrene to acrylonitrile of 85/15 may be achieved with this method.

48 Claims, No Drawings

STABLE POLYMER POLYOLS IN BASE POLYOLS WITH MOLECULAR WEIGHT GREATER THAN 4000 USING HIGH MOLECULAR WEIGHT DISPERSANTS

CROSS-REFERENCE TO RELATED APPLICATION

This application is related to U.S. patent application Ser. No. 07/197,938, filed of even date, relating to high molecular weight dispersants for polymer polyols.

FIELD OF THE INVENTION

The invention relates to the synthesis of polymer polyols, and, in one aspect, more particularly relates to styrene/acrylonitrile (SAN) copolymer polyols employing a minor amount of a higher molecular weight polyol as part of the dispersing media.

BACKGROUND OF THE INVENTION

The use of a polyol in the preparation of polyurethanes by reaction of the polyol with a polyisocyanate in the presence of a catalyst and perhaps other ingredients is well known. Conventional polyols for flexible polyurethane foams, such as slab urethane foams, are usually made by the reaction of a polyhydric alcohol with an alkylene oxide, usually ethylene oxide and/or propylene oxide, to a molecular weight of about 2,000 to 5,000 and above. These polyols are then reacted with polyisocyanate in the presence of water or other blowing agents such as fluorocarbons to obtain polyurethane foams. Polyols have been modified in many ways in attempts to improve the properties of the resulting polyurethane, for example, by using a polymer polyol as the polyol component. Conventional polyols may be used as the dispersing media or base polyol in these polymer polyols.

For example, dispersions of polymers of vinyl compounds such as styrene, acrylonitrile or a mixture of the two (abbreviated SAN), or of polyurea polymers, such as those prepared from toluene diisocyanate (TDI) and hydrazine in conventional polyols have been included to improve the properties of the polyols, and thus, the properties of the resulting foam. Polyurethane foams with higher load bearing properties (ILD-indentation load deflection or CFD - compression force deflection) may be produced in this manner. It would be desirable if polymer polyols could be prepared which would be stable and have low viscosities. Stability is important to the storage life of the polyols before they are used to make the polyurethane foams. Low viscosities and small particle sizes are important in a good quality polyol to permit it to be pumped easily in high volume foam producing equipment.

It would further be desirable if styrene/acrylonitrile polymer polyols could be synthesized which would have large SAN ratios. The substitution of styrene for acrylonitrile in these polymer polyols helps prevent discoloration during the cure of the polyurethane, and also helps improve flame retardability of the resultant foams. However, the stability of the polymer polyols decreases with increasing styrene to acrylonitrile ratios. That is, the components tend to separate upon standing during storage. The viscosity and particle size of the resultant polymer polyols are also adversely affected.

U.S. Pat. No. 4,119,586 to Shah contends that the use of a minor amount (5 to 45 wt. %) of a higher molecular weight (HMW) polyol, having a number average molecular weight not less than 5000, in conjunction with a major amount of a lower molecular weight (LMW) polyol having a molecular weight not greater than 4000 results in stable, lower viscosity polymer polyols and permits comparatively higher polymer contents. The upper limit or maximum on the molecular weight of the LMW is taught as being 4000. The lower limit or minimum amount of HMW polyol found to be necessary is 5%, preferably 10% or higher, of the total polyol.

Further, the inventors in U.S. Pat. Nos. 3,953,393 and 4,458,038 contend that high styrene content polymer polyols can be prepared by conducting the in situ polymerization in the presence of an alkyl mercaptan as a chain transfer agent in specially formulated, unsaturated polyols where specified and ostensibly critical amounts of unsaturation are necessary. However, the use of alkyl mercaptans in polyurethanes is undesirable because of malodorous qualities of the foams made with these materials. The pungent nature of these chemicals and the foams therefrom render them unacceptable to the consumer, and often to the manufacturer.

SUMMARY OF THE INVENTION

Accordingly, it is an object of the present invention to provide stable, low viscosity polymer polyols of high styrene to acrylonitrile (SAN) ratios, and a method for making such polymer polyols. In one aspect of the invention, these SAN ratios may range from about 50/50 to about 85/15.

It is another object of the present invention to provide a particular process for the production of the stable, low viscosity SAN polymer polyols of the present invention.

It is yet another object of the invention to provide stable, low viscosity polymer polyols of high SAN ratios employing a blend of a base polymer having a molecular weight greater than 4000, and a relatively small proportion, for example only about 5% and less, of a relatively high molecular weight polyol dispersant.

In carrying out these and other objects of the invention, there is provided, in one form, a method for making stable, low viscosity polymer polyols involving first adding a charge to a reactor, where the charge comprises a first portion of a high molecular weight polyol dispersant and a first portion of a base polyol having a molecular weight greater than 4000. The second step involves providing a feed stream to the reactor, where the feed stream comprises at least a monomer portion and an initiator suitable for polymerizing the monomer portion. The total of the first and second portions of the high molecular weight polyol dispersant is in the range of about 1 to 20% or less of the total of all portions of both polyols. The high molecular weight polymer polyol dispersant of this invention is preferably free of induced unsaturation. Optionally, a second portion of the high molecular weight polyol dispersant and/or a second portion of the high molecular weight polyol dispersant may be added in the feed stream.

DETAILED DESCRIPTION OF THE INVENTION

It has been discovered that a process using a high molecular weight polyol free of induced unsaturation can produce improved polymer polyols with low viscosity, good stability and higher SAN weight ratios at dispersant contents of 1 to 20 wt. % of the total polyol proportion. A smaller average particle size of the dispersed solid is also obtained. The method produces stable, low viscosity polymer polyols at SAN ratios of from 65/35 to 85/15 to even about 50/50 to 95/5. A batch reactor or a semi-batch reactor may be employed. However, a single continuous stirred tank reactor (CSTR) is completely unsuitable for the practice of the method of the invention. A single CSTR is used in U.S. Pat. No. 4,119,586 to Shah, but gives very poor results in the present invention. A plurality of CSTR reactors in series could possibly be employed if the feed to the first CSTR had the higher dispersant proportion fed to it and its product fed into a second CSTR which also received the feed stream. A relatively high concentration of dispersant is initially charged to the reactor to achieve the polymer polyols of the present invention.

In one aspect of the invention, the initial HMW dispersant may comprise all of the charge to the reactor. Alternatively, the HMW dispersant may be diluted up to a ratio of base polyol to HMW dispersant of up to 20:1. In another aspect of the invention, all of the HMW dispersant may be added to the reactor charge.

The wt. % of the HMW dispersant in the total polyol component, after the completion of the feed addition, ranges from about 1-20 wt. %. Preferably this ratio ranges from about 1-10 wt. %, where 2-8 wt. % is especially preferred, with 2-5 wt. % as often typical. Without dispersants, typical SAN ratios in conventional polymer polyols could only reach as high as the range of about 50-65. In contrast, the SAN ratios that can be supported by the polymer polyols of the present invention range from 50-95, more commonly being in the range of about 65-85. The weight percent of monomers obtainable in accordance with the method of this invention range from about 5-50%, and more typically in the range of 15-40%.

It was surprisingly discovered that the base polyol preferably has a molecular weight of greater than 4000, contrary to the teachings of U.S. Pat. No. 4,119,586, and that the HMW dispersant polyol may also be free of induced unsaturation, contrary to the teachings of U.S. Pat. Nos. 3,953,393; and 4,488,038; discussed above. The base polyol is typically made by the reaction of an initiator having a plurality of reactive hydrogens thereon with one or more alkylene oxides. Suitable initiators include, but are not limited to, glycerin, alkanolamines, alkylamines, aryl or aromatic amines, sucrose, sorbitol, trimethylol propane (TMP), α-methylglucoside, β-methylglucoside or other methylglucoside, resins of phenol, aniline and mixed phenol aniline, such as methylenedianiline or bisphenol A, Mannich condensates and mixtures thereof, for example. The base polyol may be made by alkoxylating the initiator with a desired number of moles of an alkylene oxide. Preferably, the alkylene oxide has two to four carbon atoms, and is thus, ethylene oxide, propylene oxide, butylene oxide or mixtures of these oxides. The oxides may be mixed upon addition, or may be added to the polyol initiator chain separately to form blocks or caps. In a preferred aspect, a mixture of ethylene oxide and propylene oxide are added to the initiator. The alkoxylation may or may not be catalyzed; KOH is a commonly used catalyst, although others may be employed. The base polyol should not have unsaturation intentionally incorporated into it. Its molecular weight should be greater than 4000, in one aspect 4000 to 6500, and in another aspect 4000 to 6000. In the practice of this invention the molecular weights of the HMW dispersant polyol and the base polyol cannot be the same. The molecular weight of the HMW dispersant must be about 1500, preferably about 2000 greater than that of the base polyol.

The high molecular weight polyol dispersant of this invention preferably has a molecular weight of 6000 or greater, with an especially preferred molecular weight of 8000 or greater, even up to 10,000 or greater. Its functionality may range from 2 to 4, preferably triols are employed. In one aspect, the functionality of the HMW dispersant averages about 3. The initiators listed above, along with others, may be suitable in providing the HMW dispersants useful herein. As already outlined, one or more alkylene oxides may be added together or in series to the polyhydric or polyfunctional initiators using well known techniques to make mixed or block copolymers. A catalyst may be used; a slightly preferred catalyst for the HMW dispersants is a double metal cyanide catalyst, in particular zinc hexacyanocobaltate, and the dispersant polyols may be prepared in accordance with the methods described in U.S. Pat. Nos. 3,029,505; 3,900,518; 3,941,049 and 4,355,100, incorporated by reference herein. It has been discovered that lower viscosity polymer polyols may result if the HMW dispersant is made using zinc hexacyanocobaltate as the catalyst. Other catalysts may be employed, such as KOH, for example.

The number average molecular weights of the polyols are used herein, and are the theoretical (or apparent) values calculated from theoretical functionality and hydroxyl number. The true number average molecular weights may be somewhat less, depending on how much the true functionality is below the starting or theoretical functionality. Of course, in order to secure stable polymer polyols, the base polyol and the HMW dispersant should be compatible with one another.

The preparation of the polymer polyols of the present invention may be performed at a temperature in the range of 80° to 150° C., preferably in the range of about 100° to 130° C., although the reaction temperature is not particularly critical to the practice of the method of the invention. The proportion of the total polyol in the feed, where total polyol is defined as all portions of both the HMW polyol dispersant and the base polyol, may range from 50 to 99 wt. %, where the preferable proportion of the total polyol in the feed stream ranges from about 65 to 97 wt. %, with an especially preferred range of 80 to 95 wt. %.

The addition time of the feed stream to the reactor contents may range from 0.5 to 4.0 hours, preferably 1 to 2.5 hours, although neither of these ranges are particularly critical. The proportion of the polymerization initiator as a wt. % of the total reactants may range from 0.05 to 5.0 wt. %, preferably 0.1 to 1.0 wt. %.

The preferred monomers employed in the method and polymer polyols of the present invention are both styrene and acrylonitrile to make a copolymer. The relative proportions of styrene to acrylonitrile, the SAN ratio, has been discussed above and will exemplified below. Other suitable monomers include, but are not limited to, butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, substituted styrenes such as cyanostyrene, nitrostyrene, N,N-dimethylaminostyrene, acetoxystyrene, methyl 4-vinylbenzoate, phenoxystyrene, p-vinyl diphenyl sulfide, p- vinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2,butoxy-2'-vinyloxy diethyl ether, vinyl 2-ethyl-mercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, maleic anhydride, maleimide, N-substituted maleimides, such as N-phenylmaleimide and the like.

The polymerization initiator catalyst may be any suitable initiator for the particular monomers employed. Suitable catalytic initiators useful in producing the polymer polyol compositions of this invention are the free radical type of vinyl polymerization catalysts, such as the peroxides, persulfates, perborates, percarbonates, azo compounds, and the like. Specific examples include, but are not limited to, 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperneodecanoate, t-butylperbenzoate, t-butyl percrotonate, t-butyl perisobutyrate, di-t-butyl perphthalate, for example. Other suitable catalysts may be employed, of course.

PROCEDURES FOR MEASUREMENTS OF PHYSICAL PROPERTIES OF POLYMER POLYOLS

Viscosity was measured using a Brookfield cone and plate viscometer, Spindle #CP-52, operated at 20 secs$^{-1}$ at 25° C.

Particle sizes were measured using a Coulter N4 Particle Size Analyzer with o-xylene or isopropyl alcohol as the dispersing media.

Centrifugable solids were determined by centrifuging a sample of the polymer polyol for about 24 hours at about 3300 rpm and 1470 radial centrifugal "g" forces. The centrifuge tube was then inverted and allowed to drain for 4 hours. The non-flowing cake at the bottom of the tube is reported as weight percent of the initial weight of the sample tested.

The method and polymer polyols of the invention will be further described with respect to the following illustrative examples.

EXAMPLES 1-8

All the polymer polyols prepared according to the method of the invention incorporated some version of the following experimental procedure unless otherwise specified. Into a 3 liter, 4-neck resin kettle equipped with stirrer, condenser, thermometer, addition tube, were charged the indicated amounts of base polyol and dispersant polyol under a blanket of nitrogen. After heating the reactor charge to reaction temperature, the feed charge or stream was added over the indicated time period to give a milk-white polymer polyol. Upon completion of the addition, the polymer polyol was held at the indicated reaction temperature for from 0.5 to 1.0 hours, the soak time or digest time, and then the reaction mixture was stripped for 1.5 to 2.5 hours at about 90° to 120° C. at less than 5 mm Hg to yield the polymer polyols.

These examples illustrate the effect of adding HMW polyol at various SAN ratios ranging from 65/35 to 90/10. The molecular weight of the dispersants were in all cases 6000 or greater. The dispersants in all remaining examples are described in further detail below. The effect of dispersant molecular weight on polymer polyols with SAN ratios of 75/25 is also explored. Note that all polymer polyols within the scope of the invention show improvements in having lower viscosities, increased stabilities and smaller particle size. The base polyol used in all of these examples was THANOL® SF-5505 (4800 MW, OH#34).

Although example 2 using 5% dispersant gives roughly comparable results to example 1 using SAN ratios of 67/33, the difference between using a dispersant and not using one is much more evident at higher SAN ratios. Compare example 3 with unacceptably high viscosity (6640), particle size (>3 μm) and centrifugable solids (29.9), with examples 4-6 which formed good polymer polyols. Note that example 7, most comparable to example 8 at a SAN ratio of 85/15, did not form a polymer polyol at all, but instead formed a two phase system, although the polymer polyol of example 8 had low viscosity, and somewhat higher centrifugable solids.

TABLE OF DISPERSANTS

Dispersants 1-5 were prepared according to the procedures described in U.S. Pat. Nos. 3,029,505; 3,900,518; 3,941,049 and 4,355,100 using a zinc hexacyanocobaltate catalyst, and have relatively low unsaturation and no induced unsaturation. Dispersant 6 was prepared using KOH as a catalyst using conventional techniques and has relatively high unsaturation. Dispersants 1-3 have a molecular weight of approximately 10,000, whereas dispersant 4 has a molecular weight of about 8000. Dispersant 5 has a molecular weight of about 9000.

Dispersant 1 is a glycerin initiated polyether of propylene oxide capped with ethylene oxide containing 7% ethylene oxide and having a hydroxyl number of 16 and an unsaturation content of 0.010 meq/g.

Dispersant 2 is a glycerin initiated polyether of propylene oxide having a hydroxyl number of 16 and an unsaturation content of 0.010 meq/g.

Dispersant 3 is a glycerin initiated polyether of propylene oxide and ethylene oxide containing 15% ethylene oxide and having a hydroxyl number of 16 and an unsaturation content of 0.010 meq/g.

Dispersant 4 is a glycerin initiated polyether of propylene oxide capped with ethylene oxide containing 7% ethylene oxide having a hydroxyl number of 19 and an unsaturation content of 0.016 meq/g.

Dispersant 5 is a glycerin initiated polyether of propylene oxide capped with ethylene oxide containing 13% ethylene oxide having a hydroxyl number of 25 and an unsaturation content of 0.013 meq/g.

Dispersant 6 is a glycerin initiated polyether of propylene oxide capped with ethylene oxide containing 13% ethylene oxide having a hydroxyl number of 19 and an unsaturation content of 0.097 meq/g.

14 where the dispersant was added in the feed and not in the reactor charge that both viscosity, particle size and centrifugable solids were increased. These two examples are closest to the procedure used in U.S. Pat. No. 4,119,586, previously discussed. All of the HMW dispersant polyols except the one used in examples 15 and 16 were prepared using zinc hexacyanocobaltate catalysts; the examples 15 and 16 dispersants were prepared using KOH as catalyst.

The SAN ratio in all examples was 75/25. The molecular weight of the dispersants were in all cases 6000 or greater. Again, all polymer polyols within the scope of

TABLE I

|  | Example No. | | | | | | | |
|---|---|---|---|---|---|---|---|---|
|  | 1 | 2 | 3 | 4 | 5 | 6 | 7 | 8 |
| Monomer Charge, Wt. % | 20 | 20 | 20 | 20 | 20 | 20 | 20 | 20 |
| SAN Weight Ratio | 67/33 | 67/33 | 75/25 | 75/25 | 75/25 | 75/25 | 85/15 | 85/15 |
| Dispersant | None | 1 | None | 5 | 4 | 1 | None | 1 |
| % Dispersant of Total Polyol | — | 5 | — | 5 | 5 | 5 | — | 5 |
| % of Total Polyol in Feed | 89 | 89 | 89 | 89 | 89 | 89 | 89 | 89 |
| Reaction Temp., °C. | 110–115 | → | → | → | → | → | → | → |
| Initiator Conc., Wt. % | 0.5 | 0.5 | 0.5 | 0.5 | 0.5 | 0.5 | 0.5 | 0.5 |
| Feed, Addition Time, hr. | 2.0 | 2.0 | 2.0 | 2.0 | 2.0 | 2.0 | 2.0 | 2.0 |
| Feed, g. | | | | | | | | |
| Styrene | 268 | 268 | 300 | 300 | 300 | 300 | 340 | 340 |
| Acrylonitrile | 132 | 132 | 100 | 100 | 100 | 100 | 60 | 60 |
| VAZO 67 | 10 | 10 | 10 | 10 | 10 | 10 | 10 | 10 |
| Base Polyol | 1420 | 1420 | 1420 | 1420 | 1420 | 1420 | 1420 | 1420 |
| Toluene | 10 | 10 | 10 | 10 | 10 | 10 | 10 | 10 |
| Reactor Charge, g. | | | | | | | | |
| Base Polyol | 180 | 100 | 180 | 100 | 100 | 100 | 180 | 100 |
| Dispersant | — | 80 | — | 80 | 80 | 80 | — | 80 |
| Polymer Polyol Properties | | | | | | | | |
| Viscosity cps, 20/sec | 2510 | 2300 | 6640 | 3620 | 2160 | 2170 | * | 1590 |
| Particle Size, μm | 1.26 | 0.84 | >3 | >2.5 | 1.40 | 1.25 | — | — |
| Centrifugable Solids, Wt. % | 2.7 | 1.9 | 29.9 | 9.9 | 2.0 | 2.7 | — | 9.0 |

*No dispersion; two phase system

EXAMPLES 9–18

These examples outlined in Table II illustrate the importance of adding a HMW dispersant to the reactor charge, rather than to the feed charge. That is, a semi-batch process is used that maintains a high initial concentration of dispersants. Note that in examples 13 and the invention show improvements in having lower viscosities, increased stabilities and smaller particle size. The base polyol used in all of these examples was again THANOL SF-5505. Again the lack of dispersant in example 9 gives a polymer polyol with undesirable properties, as compared with the polymer polyols of examples 10–12, and 15–17.

TABLE II

|  | Example No. | | | | | | | | | |
|---|---|---|---|---|---|---|---|---|---|---|
|  | 9 | 10 | 11 | 12 | 13 | 14 | 15 | 16 | 17 | 18 |
| Monomer Charge, Wt. % | 20 | 20 | 20 | 20.2 | 20 | 20 | 20 | 20 | 20 | 20 |
| SAN Weight Ratio | 75/25 | 75/25 | 75/25 | 75/25 | 75/25 | 75/25 | 75/25 | 75/25 | 75/25 | 75/25 |
| Dispersant | None | 1 | 1 | 1 | 1 | 1 | 6 | 6 | 2 | 3 |
| % Dispersant of Total Polyol | 0 | 3 | 5 | 10.1 | 5 | 10 | 5 | 10 | 5 | 5 |
| % of Total Polyol in Feed | 70 | 70 | 70 | 70 | 70 | 70 | 70 | 70 | 70 | 70 |
| Reaction Temp., °C. | 110–115 | → | → | → | → | → | → | → | → | → |
| Initiator Conc., Wt. % | 0.5 | 0.5 | 0.5 | 0.5 | 0.5 | 0.5 | 0.5 | 0.5 | 0.5 | 0.5 |
| Feed, Addition Time, hr. | 2 | 2 | 1.8 | 2 | 2 | 2 | 2 | 2.3 | 2 | 2 |
| Reactor Charge, g. | | | | | | | | | | |
| Base Polyol | 480 | 432 | 400 | 300 | 480 | 480 | 400 | 320 | 400 | 400 |
| Dispersant | — | 48 | 80 | 160 | — | — | 80 | 160 | 80 | 80 |
| Feed | | | | | | | | | | |
| Styrene | 300 | 300 | 300 | 300 | 300 | 300 | 300 | 300 | 300 | 300 |
| Acrylonitrile | 100 | 100 | 100 | 100 | 100 | 100 | 100 | 100 | 100 | 100 |
| VAZO 67 | 10 | 10 | 10 | 10 | 10 | 10 | 10 | 10 | 10 | 10 |
| Base Polyol | 1120 | 1120 | 1120 | 1120 | 1040 | 960 | 1120 | 1120 | 1120 | 1120 |
| Toluene | 10 | 10 | 10 | 10 | 10 | 10 | 10 | 10 | 10 | 10 |
| DisperSant | — | — | — | — | 80 | 160 | — | — | — | — |
| Polymer Polyol Properties | | | | | | | | | | |
| Overall Monomer Conv., % | 96.0 | 96.2 | — | 96.7 | 96.5 | 97.9 | 96.8 | — | 97.6 | 94.3 |
| Viscosity, cps | 8000 | 2780 | 2440 | 2480 | 4060 | 4320 | 2910 | 2550 | 2680 | 3560 |
| Particle Size, μm | >3 | 1.2 | 1.13 | 0.97 | 1.74 | 1.87 | 1.35 | 1.03 | 1.12 | 0.51 |

TABLE II-continued

| | Example No. | | | | | | | | | |
|---|---|---|---|---|---|---|---|---|---|---|
| | 9 | 10 | 11 | 12 | 13 | 14 | 15 | 16 | 17 | 18 |
| Centrifugable Solids, Wt. % | 9.4 | 2.5 | 2.3 | 2.0 | 4.5 | 5.5 | 2.4 | 2.3 | 2.2 | 2.8 |

EXAMPLES 19-23

Examples 19-23 are set forth in Table III and illustrate the use of yet another base polyol in the method of the present invention. In all of these examples, AR-COL ® 1342 is used as the base polyol, which has a molecular weight of 4800. The SAN ratio is held at 75/25. Once again, the polymer polyols of the present invention, examples 21, 22 and 23 give suitable polymer polyols, in contrast to the polymer polyols of examples 19 and 20.

TABLE III

| | Example No. | | | | |
|---|---|---|---|---|---|
| | 19 | 20 | 21 | 22 | 23 |
| Monomer Charge, Wt. % | 20 | 20 | 20 | 20 | 20 |
| SAN Weight Ratio | 75/25 | 75/25 | 75/25 | 75/25 | 75/25 |
| Dispersant | None | None | 1 | 3 | 6 |
| % Dispersant of Total Polyol | — | — | 5 | 5 | 5 |
| % of Total Polyol in Feed | 90 | 90 | 90 | 70 | 70 |
| Reaction Temp., °C. | 120 | 120 | 120 | 120 | 120 |
| Initiator Conc., Wt. % | 0.5 | 0.25 | 0.25 | 0.25 | 0.25 |
| Feed, Addition Time, hr. | 2.0 | 2.0 | 2.0 | 2.0 | 2.0 |
| Feed, g. | | | | | |
| Styrene | 300 | 300 | 300 | 300 | 300 |
| Acrylonitrile | 100 | 100 | 100 | 100 | 100 |
| VAZO 67 | 10 | 5 | 5 | 5 | 5 |
| Base Polyol | 1440 | 1440 | 1440 | 1120 | 1120 |
| Reactor Charge, g. | | | | | |
| Base Polyol | 160 | 160 | 80 | 400 | 400 |
| Dispersant | — | — | 80 | 80 | 80 |
| Polymer Polyol Properties | | | | | |
| Overall Monomer Conv., % | 94.8 | 93.0 | 92.7 | 92.5 | 93.2 |
| Viscosity cps,20/sec | 7400 | 4620 | 2000 | 2220 | 2270 |
| Particle Size, μm | >3 | >3 | 1.21 | 1.00 | 1.07 |
| Centrifugable Solids, Wt. % | 31.7 | 39.6 | 4.7 | 3.4 | 3.3 |

The polymer polyols prepared in accordance with the above examples may then be incorporated into a formulation which results in a polyurethane product. The polymer polyol of the invention may be used in conjunction with a polyisocyanate such as those mentioned above or may be combined with additional polyols well known in the art, and reacted with a polyisocyanate to form a polyurethane foam product. In order to form the polyurethane foam, a catalyst useful in preparing foams of this type is employed in the usual manner. Such catalyst may include those mentioned above, or one or more of the following: tertiary amines; tertiary phosphines; strong bases such as alkali and alkaline earth metal hydroxides, alkoxides, and phenoxides; acidic metal salts of strong acids; chelates of various metals; alcoholates and phenolates of various metals; salts of organic acids with a variety of metals; organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 parts by weight percent based on 100 parts by weight of the polyol. More often the amount of catalyst used is 0.2 to 2.0 parts by weight.

As is well known, the polyol component for the polyurethane foam is reacted in the presence of one or more of the above catalysts with a polyisocyanate according to conventional procedures. The polyisocyanate used may be any aromatic or aliphatic polyisocyanate.

Foaming is carried out in the presence of water and, optionally, additional organic blowing agents. The water is normally used in amounts of 0.5 to 15 parts by weight, preferably, 1.0 to 10 parts by weight (pbw) based on 100 parts by weight of the polymer polyol and any additional polyol present. The organic blowing agents optionally used along with the water are known in the art and are, for example, monofluorotrichloromethane, difluorodichloromethane, methylene dichloride and others generally known in the art. Additives to regulate the cell size and the cell structure, for example, silicone surfactant such as dimethylpolysiloxanes, may also be added to the foaming mixture. Fillers, flame retarding additives, dyes or plasticizers of known types may also be used. These and other additives are well known to those skilled in the art. More information on the preparation of polyurethane foams may be found in companion patent application Ser. No. 07/197,938, incorporated by reference herein.

GLOSSARY

ARCOL ® 1342: A trimethylolpropane initiated polyether of propylene oxide and ethylene oxide containing about 14% ethylene oxide with a hydroxyl number of 35 and a primary hydroxyl group content of 75-80% based on the total hydroxyl content of the polyether.

THANOL ® SF-5505: A glycerin initiated polyether of propylene oxide and ethylene oxide containing about 20% ethylene oxide with a hydroxyl number of 34 and a primary hydroxyl group content of 80% based on the total hydroxyl content of the polyether, amde by ARCO Chemical Company.

Vazo 67: 2,2'-Azobis(2-methylbutanenitrile) polymerization catalyst made by E.I. duPont de Nemours and Co.

Thus, it is apparent that this invention makes possible the use of a base polyol having a molecular weight greater than 4000 in the synthesis of SAN containing polymer polyols and results in the ability to use higher SAN weight ratios, even up to 85/15, and higher polymer solids contents along with lower viscosities. Further, the use of a semi-batch reactor with a relatively high concentration of dispersant initially charged to the reactor help achieve these results. Unusually, 5% or less of the total polyol may be a HMW dispersant to achieve these excellent results.

Many modifications may be made in the polymer polyols of this invention and their method of production without departing from the spirit and scope of the invention, which is defined only in the appended claims.

For example, one skilled in the art could adjust the temperature, pressure, reactants, proportions and modes of additions within the parameters set forth to provide polymer polyols with particularly advantageous properties, or polymer polyols that give foams with optimal properties.

We claim:

1. A method for making stable, low viscosity polymer polyols comprising the steps of:
   adding a charge to a reactor, where the charge comprises a high molecular weight polyol dispersant;
   providing a feed stream to the reactor, where the feed stream comprises a base polyol having a molecular weight of greater than 4000, a monomer portion and an initiator suitable for polymerizing the monomer portion,
   where the high molecular weight polyol dispersant is in the range of about 1 to 20% of the total of all polyols.

2. The method for making polymer polyols of claim 1 where the high molecular weight polyol dispersant has a molecular weight greater than about 6000 and a functionality ranging from about 2 to 4.

3. The method for making polymer polyols of claim 1 where the high molecular weight polyol dispersant in the reactor charge is a first portion, and a second high molecular weight dispersant portion is present in the feed stream, and both the first portion and second portion of the high molecular weight polyol dispersant together are in the range of about 1 to 20% of the total of all portions of both polyols.

4. The method for making polymer polyols of claim 1 where the monomer portion is a mixture of styrene and acrylonitrile in a ratio of styrene to acrylonitrile of from about 50/50 to 95/5.

5. The method for making polymer polyols of claim 1 where the monomer portion is a mixture of styrene and acrylonitrile in a ratio of styrene to acrylonitrile of from about 65/35 to 85/15.

6. The method for making polymer polyols of claim 1 where the concentration of the high molecular weight polyol dispersant in the charge to the reactor ranges from 10 to 100 wt. % of the total polyol in the charge.

7. The method for making polymer polyols of claim 1 where the reactor is selected from the group of reactors consisting of a batch reactor, a semi-batch reactor and a plurality of continuous stirred tank reactors (CSTRs) in series.

8. The method for making polymer polyols of claim 3 where the total of the first and second portions of the high molecular weight polyol dispersant is in the range of about 1 to 5% of the total of all portions of both polyols.

9. The method for making polymer polyols of claim 3 where the total of the first and second portions of the high molecular weight polyol dispersant is in the range of about 1 to 3% of the total of all portions of both polyols.

10. The method for making polymer polyols of claim 3 where the total of the first and second portions of the high molecular weight polyol dispersant is in the range of about 1 to 2% of the total of all portions of both polyols.

11. The method for making polymer polyols of claim 1 where the viscosity of the resulting polymer polyols is less than about 5000 cps.

12. The method for making polymer polyols of claim 1 where the high molecular weight polyol dispersant is made by adding an alkylene oxide component to a polyfunctional initiator in the presence of a zinc hexacyanocobaltate catalyst.

13. The method for making polymer polyols of claim 1 where the wt. % of the total of all polyols that is present in the feed ranges from 50 to 99 wt %.

14. The method for making polymer polyols of claim 1 where the reactor charge additionally comprises a base polyol having a molecular weight of greater than 4000.

15. The method for making polymer polyols of claim 14 where the high molecular weight polyol dispersant has a molecular weight greater than about 6000 and a functionality ranging from about 2 to 4.

16. The method for making polymer polyols of claim 14 where the high molecular weight polyol dispersant in the reactor charge is a first portion, and a second high molecular weight dispersant portion is present in the feed stream, and both the first portion and second portion of the high molecular weight polyol dispersant together are in the range of about 1 to 20% of the total of all portions of both polyols.

17. The method for making polymer polyols of claim 14 where the monomer portion is a mixture of styrene and acrylonitrile in a ratio of styrene to acrylonitrile of from about 50/50 to 95/5.

18. The method for making polymer polyols of claim 14 where the monomer portion is a mixture of styrene and acrylonitrile in a ratio of styrene to acrylonitrile of from about 65/35 to 85/15.

19. The method for making polymer polyols of claim 14 where the concentration of the high molecular weight polyol dispersant in the charge to the reactor ranges from 10 to 50 wt. % of the total polyol in the charge.

20. The method for making polymer polyols of claim 14 where the reactor is selected from the group of reactors consisting of a batch reactor, a semi-batch reactor and a plurality of continuous stirred tank reactors (CSTRs) in series.

21. The method for making polymer polyols of claim 16 where the total of the first and second portions of the high molecular weight polyol dispersant is in the range of about 1 to 5% of the total of all portions of both polyols.

22. The method for making polymer polyols of claim 16 where the total of the first and second portions of the high molecular weight polyol dispersant is in the range of about 1 to 3% of the total of all portions of both polyols.

23. The method for making polymer polyols of claim 16 where the total of the first and second portions of the high molecular weight polyol dispersant is in the range of about 1 to 2% of the total of all portions of both polyols.

24. The method for making polymer polyols of claim 14 where the viscosity of the resulting polymer polyols is less than about 5000 cps.

25. The method for making polymer polyols of claim 14 where the high molecular weight polyol dispersant is made by adding an alkylene oxide component to a polyfunctional initiator in the presence of a zinc hexacyanocobaltate catalyst.

26. The method for making polymer polyols of claim 14 where the wt. % of the total of all polyols that is present in the feed ranges from 50 to 99 wt %.

27. The method for making polymer polyols of claim 14 where the base polyol in the reactor charge and the base polyol in the reactor feed are the same polyol.

28. A method for making stable, low viscosity polymer polyols comprising the steps of:
   adding a charge to a reactor, where the charge comprises a high molecular weight polyol dispersant having a molecular weight greater than about 6000;
   providing a feed stream to the reactor, where the feed stream comprises a base polyol having a molecular weight greater than 4000, a monomer portion and an initiator suitable for polymerizing the monomer portion,
where the high molecular weight polyol dispersant is in the range of about 1 to 5% of the total of all polyols.

29. The method for making polymer polyols of claim 28 where the high molecular weight dispersant polyol has an absence of induced unsaturation.

30. The method for making polymer polyols of claim 28 where the monomer portion is a mixture of styrene and acrylonitrile in a ratio of styrene to acrylonitrile of from about 65/35 to 85/15.

31. The method for making polymer polyols of claim 28 where the concentration of the high molecular weight polyol dispersant in the charge to the reactor ranges from 10 to 100 wt. % of the total polyol in the charge.

32. The method for making polymer polyols of claim 28 where the reactor is selected from the group of reactors consisting of a batch reactor, a semi-batch reactor and a plurality of continuous stirred tank reactors (CSTRs) in series.

33. The method for making polymer polyols of claim 28 where the high molecular weight polyol dispersant in the reactor charge is a first portion, and a second portion of high molecular weight polyol dispersant is present in the feed stream, and the total of the first and second portions of the high molecular weight polyol dispersant is in the range of about 1 to 3% of the total of all portions of both polyols.

34. The method for making polymer polyols of claim 33 where the total of the first and second portions of the high molecular weight polyol dispersant is in the range of about 1 to 2% of the total of all portions of both polyols.

35. The method for making polymer polyols of claim 28 where the reactor charge further comprises a base polyol having a molecular weight greater than 4000.

36. The method for making polymer polyols of claim 33 where the base polyol in the reactor charge and the base polyol in the feed stream are the same polyol.

37. A method for making stable, low viscosity polymer polyols comprising the steps of:
   adding a charge to a reactor, where the charge comprises a first portion of a high molecular weight polyol dispersant having a molecular weight greater than about 6000 and being free from induced unsaturation, and a first portion of a base polyol having a molecular weight greater than 4000, where the concentration of the high molecular weight polyol dispersant in the charge to the reactor ranges from 10 to 50 wt. % of the total polyol in the charge;
   providing a feed stream to the reactor, where the feed stream comprises a second portion of the high molecular weight polyol dispersant, a second portion of the base polyol, a monomer portion and an initiator suitable for polymerizing the monomer portion,
where the total of the first and second portions of the high molecular weight polyol dispersant is in the range of about 1 to 5% of the total of all portions of both polyols.

38. The method for making polymer polyols of claim 37 where the monomer portion is a mixture of styrene and acrylonitrile in a ratio of styrene to acrylonitrile of from about 65/35 to 85/15.

39. The method for making polymer polyols of claim 37 where the reactor is selected from the group of reactors consisting of a batch reactor, a semi-batch reactor and a plurality of continuous stirred tank reactors (CSTRs) in series.

40. The method for making polymer polyols of claim 37 where the total of the first and second portions of the high molecular weight polyol dispersant is in the range of about 1 to 2% of the total of all portions of both polyols.

41. Stable, low viscosity polymer polyols made by the process comprising the steps of:
   adding a charge to a batch reactor, where the charge comprises a high molecular weight polyol dispersant;
   providing a feed stream to the reactor, where the feed stream comprises a base polyol having a molecular weight greater than 4000, a monomer portion and an initiator suitable for polymerizing the monomer portion,
where the high molecular weight polyol dispersant is in the range of about 1 to 20% of the total of all polyols.

42. The stable, low viscosity polymer polyols of claim 41 where the base polyol has an absence of induced unsaturation.

43. The stable, low viscosity polymer polyols of claim 41 where the monomer portion is a mixture of styrene and acrylonitrile in a ratio of styrene to acrylonitrile of from about 50/50 to 95/5.

44. The stable, low viscosity polymer polyols of claim 41 where the monomer portion is a mixture of styrene and acrylonitrile in a ratio of styrene to acrylonitrile of from about 65/35 to 85/15.

45. The stable, low viscosity polymer polyols of claim 41 where the viscosity of the resulting polymer polyols is less than about 5000 cps.

46. The stable, low viscosity polymer polyols of claim 41 where the reactor charge also comprises a base polyol having a molecular weight greater than 4000.

47. The stable, low viscosity polymer polyols of claim 46 where the base polyol in the reactor charge and the base polyol in the feed stream are the same polyol.

48. A polyurethane product made by a process comprising reacting a polymer polyol with an organic polyisocyanate in the presence of a polyurethane catalyst, where the polymer polyol is made by the process comprising the steps of:
   adding a charge to a batch reactor, where the charge comprises a high molecular weight polyol dispersant;
   providing a feed stream to the reactor, where the feed stream comprises a base polyol having a molecular weight greater than 4000, a monomer portion and an initiator suitable for polymerizing the monomer portion,
where the high molecular weight polyol dispersant is in the range of about 1 to 20% of the total of all polyols.

* * * * *